April 30, 1968 H. F. GARRISON 3,380,478
HOT AND COLD WATER MIXING FAUCET
Filed March 25, 1965
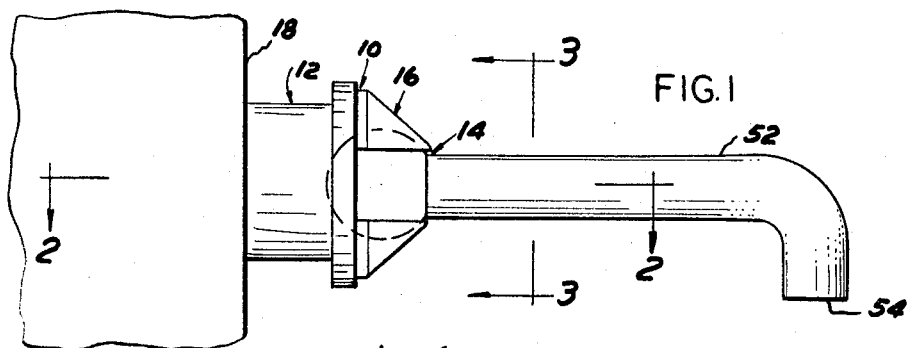
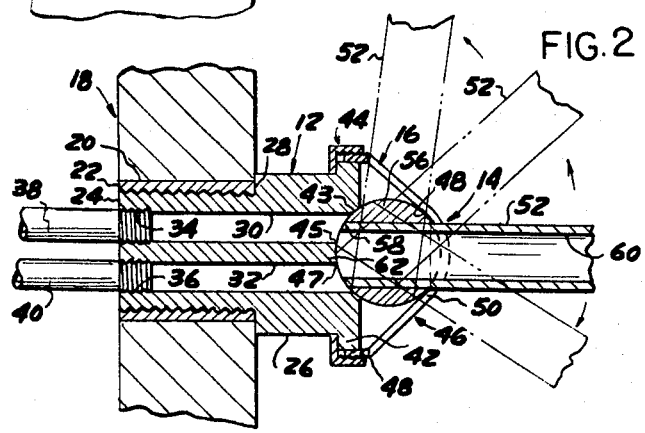
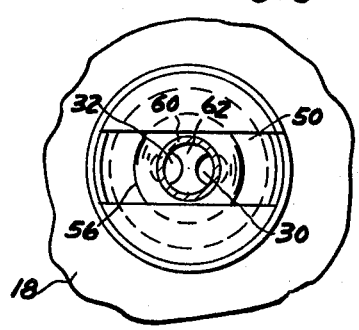
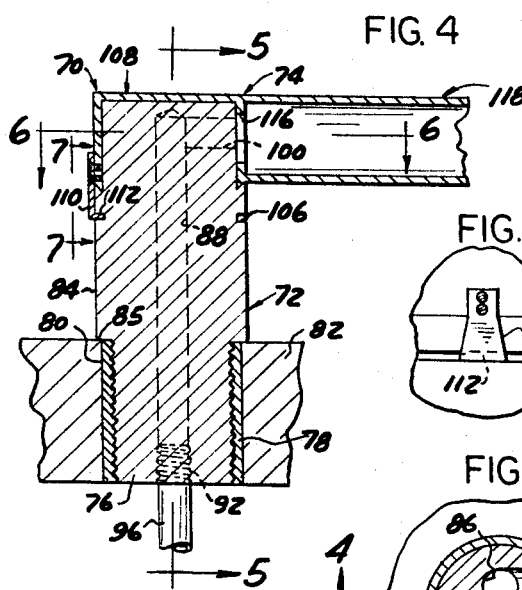
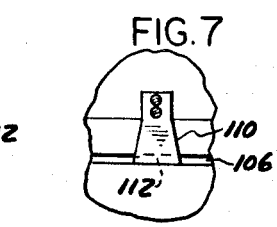
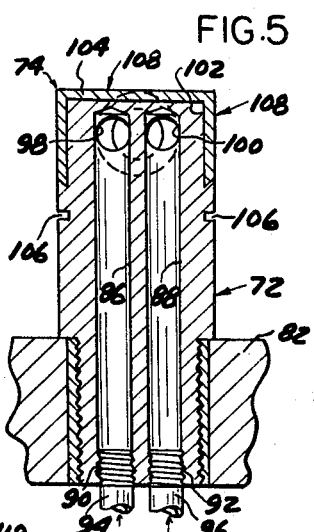
INVENTOR.
HARRY F. GARRISON.
BY Barthel & Bugbee
ATTORNEYS

United States Patent Office 3,380,478
Patented Apr. 30, 1968

3,380,478
HOT AND COLD WATER MIXING FAUCET
Harry F. Garrison, 7470 Gerald,
Warren, Mich. 48092
Filed Mar. 25, 1965, Ser. No. 442,600
1 Claim. (Cl. 137—625.41)

ABSTRACT OF THE DISCLOSURE

A mixing faucet for mixing hot and cold water in varying proportions has a stationary structure with hot and cold water passageways therethrough with closely-adjacent outlet ports opening into a concave spherical or cylindrical seat and a movable structure including a spout having a convex spherical or cylindrical coupling portion matingly engaging the seat and having therein a discharge passageway with an inlet port movable past the outlet ports of said stationary passageways sliding engagement of said coupling portion with said seat so as to vary the proportions of hot and cold water emerging from said spout by moving said spout laterally relatively to said stationary structure.

---

Other objects and advantages of the invention will become apparent during the course of the following description of the accompanying drawing, wherein:

FIGURE 1 is a side elevation of a mixing faucet, according to one form of the invention;

FIGURE 2 is a horizontal section through the mixing faucet of FIGURE 1, taken along the line 2—2 therein;

FIGURE 3 is a vertical section, partly in front elevation, looking in the direction of the arrows 3—3 in FIGURE 1;

FIGURE 4 is a central vertical section through a modified mixing faucet taken along the line 4—4 in FIGURE 6;

FIGURE 5 is a vertical longitudinal section at right angles to FIGURE 4, taken along the line 5—5 in FIGURE 4;

FIGURE 6 is a horizontal section taken along the line 6—6 in FIGURE 4; and

FIGURE 7 is a fragmentary rear elevation looking in the direction of the arrows 7—7 in FIGURE 4.

Referring to the drawing in detail, FIGURE 1 shows a hot and cold water mixing faucet, generally designated 10, according to one form of the invention, as consisting generally of a stationary faucet structure 12, a movable faucet structure 14, a retaining device 16 for retaining the movable faucet structure 14 in connection with the stationary faucet structure 12, and a faucet supporting structure 18, such as a wall of a room or the splash panel of a sink, washbowl or the like. The supporting structure 18, accordingly is shown merely diagrammatically, but it is provided with a horizontal hole 20 containing an internally-threaded bushing 22 (FIGURE 2) cemented or otherwise solidly secured in the hole 20. Threaded into the bushing 22 is the reduced-diameter externally-threaded stem portion 24 of the stationary structure 12 which joins the enlarged forward portion 26 in an annular shoulder 28 abutting the stationary structure 12. The stationary structure 12 is provided with a pair of parallel hot and cold water passageways 30 and 32 respectively internally-threaded at 34 and 36 respectively to receive the ends of hot and cold water pipes 38 and 40 respectively. The stationary structure 12 at its forward end terminates in an annular cylindrical flange 42, and is provided with a concave spherical seat 43 spanning the outlet ports 45 and 47 of the hot and cold water passageways 30 and 32 respectively.

Fitting over the annular flange 42 is an internally-flanged coupling ring 44 which forms the rearward element of the coupling device 16, the forward element 46 of which is a shell of frusto-conical shape with an externally-threaded rearward flange 48 gripped by the internally-flanged connecting ring 44. The forward element 46 of the coupling device 16 near its apex is provided with an internal concave spherical seat 48 adjacent the upper and lower sides of an elongated transverse slot 50.

The movable structure 14 consists of a spout 52 with a downwardly-bent forward or discharge end 54 and with a coupling ball 56 secured to its rearward end 58 in sliding engagement with the correspondingly spherical seat 48 and with the spout 52 projecting forwardly through the elongated horizontal slot 50. The spout 52 is provided with a passageway 60 extending from its rearward or inlet end 58 to its forward or outlet end 54. The ball 56 and passageway 60 are so located relatively to the partition wall 62 between the hot and cold water passageways 30 and 32 that the partition wall 62 bisects the passageway 60 when the spout 52 is in its midposition shown in solid lines in FIGURE 2.

In the operation of the mixing faucet 10, both the hot water entering the passageway 30 from the hot water pipe 38 and the cold water entering the passageway 32 from the cold water pipe 40 are completely cut off and the flow of water terminated when the spout 52 is rotated counterclockwise to its extreme lateral position as shown in the uppermost dotted line position 52 in FIGURE 2. The same result, of course, is attained by swinging the spout 52 clockwise to its extreme right-hand position (not shown). When the spout 52 is in its middle or solid line position of FIGURE 2, the partition wall 62 approximately equally divides the flow of water between the hot and cold water passageways 30 and 32 respectively. When the spout 52 is swung to an intermediate position, as shown by the dotted line positions nearest the solid line position in FIGURE 2, the flow of water is entirely hot or entirely cold as the case may be since either the hot water passageway 30 or the cold water passageway 32 is shut off from the outlet passageway 60 of the spout 52.

The modified mixing faucet, generally designated 70, shown in FIGURES 4 to 7 inclusive is intended to be mounted with its stationary faucet structure 72 in an upright position and its movable faucet structure 74 in a mainly horizontal position with the reduced diameter externally-threaded portion 76 mounted in an internally threaded sleeve 78 in a vertical bore 80 in the faucet supporting structure 82 (FIGURE 4) such as the counter, sink apron or washbowl flange, as the case may be. As before, the stationary structure 72 is provided with an enlarged portion 84 providing an annular shoulder 85 between it and the reduced diameter portion 76. The latter is provided with two parallel vertical passageways 86 and 88 for hot and cold water respectively and internally-threaded at their lower ends as at 90 and 92 respectively (FIGURE 5) for the reception of the correspondingly-threaded upper ends of hot and cold water pipes 94 and 96 respectively. Extending forwardly from the upper end portions of the hot and cold water passageways 86 and 88 are horizontal outlet passageways 98 and 100. The upper portion of the stationary structure 72 is also provided with a reduced diameter portion 102 extending downwardly from the upper end 104 thereof and terminating a short distance above an annular groove 106. The movable structure 74 is provided with a cup-shaped cylindrical cap 108 (FIGURE 4) which snugly but slidably fits the reduced diameter upper portion 102 of the stationary structure 72.

Bolted, riveted or otherwise secured to the side wall of the cap 108 is an L-shaped retaining member 110 (FIGURE 7), the inwardly-projecting arcuate lower flange or projection 112 of which extends into and engages the annular groove 106 so as to hold down the cap 108 against the pressure of the water in the passageways 86 and 88. As before, a partition wall 114 (FIGURE 6) separates the hot and cold water outlet passageways 98 and 100, and in the midposition of the movable structure 74 this partition wall 114 is located in the middle of an outlet port 116 in the side wall of the cap 108. Secured to and extending forwardly from the cap 108 from the port 116 thereof is a spout 118 similar to the spout 52 of FIGURE 1, with an outlet passageway 120 therein.

The operation of the modified mixing faucet 70 is similar to that of the mixing faucet 10 in that the spout 118 is swung from side to side in order to vary the proportionate distribution of hot and cold water from the outlet passageways 98 and 100 thereof. Such swinging action moves the port 116 laterally relatively to the partition wall 114 (FIGURE 6) between the hot and cold water outlet passageways 98 and 100 so as to enlarge the size of the one and reduce the size of the other. When the spout 118 is swung counterclockwise from its solid line position of FIGURE 6, a greater portion of hot water will be present in the water emerging through the outlet passageway 120 of the spout 118, whereas swinging the latter clockwise causes the cold water to predominate proportionately.

What I claim is:
1. A hot and cold water mixing faucet, comprising
   a stational faucet structure including an externally-threaded horizontal cylindrical stem having closely-adjacent hot and cold water outlet ports disposed side-by-side with a partition wall therebetween and having closely-adjacent parallel horizontal hot and cold water passageways also disposed side-by-side and extending through said stationary structure to said hot and cold water outlet ports respectively,
   said stationary faucet structure having a coupling bearing portion of concavely-arcuate cross-section disposed adjacent said outlet ports,
   a generally horizontal movable faucet structure including a generally horizontal movable water discharge spout having a mixed water inlet port at the rearward end thereof disposed adjacent said hot and cold water outlet ports in overlapping relationship with said outlet ports and with said partition wall and also having an elongated water passageway therethrough which is substantially straight for the major part of its length from said inlet port forward,
   said movable faucet structure also including a coupling member of convexly arcuate cross-section mounted on the rearward end of said spout in sliding mating bearing engagement with said bearing portion of concavely-arcuate cross-section,
and a retaining member secured to said stem and contacting said coupling member for retaining said coupling member in sliding bearing engagement with said bearing portion, said coupling member being mounted in said bearing portion for lateral swinging movement of said spout relatively to said stationary faucet structure and said retaining member having an elongated horizontal slot therein, said spout projecting horizontally forward from said bearing portion through said slot.

References Cited

UNITED STATES PATENTS

| 1,138,187 | 5/1915 | Bridges | 137—625.17 X |
| 2,854,027 | 9/1958 | Kaiser | 137—625.41 |

FOREIGN PATENTS

| 609,518 | 1948 | Great Britain. |
| 327,547 | 1935 | Italy. |

M. CARY NELSON, *Primary Examiner.*

M. O. STURM, *Assistant Examiner.*